(12) United States Patent
Kortan et al.

(10) Patent No.: US 8,192,095 B2
(45) Date of Patent: Jun. 5, 2012

(54) SENSOR ASSEMBLY FOR A VEHICLE WINDSHIELD

(75) Inventors: Josef Kortan, Ludenscheid (DE); Frank Blaesing, Werl (DE); Ralf Boebel, Holzwickede (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 0 days.

(21) Appl. No.: 12/987,226

(22) Filed: Jan. 10, 2011

(65) Prior Publication Data

US 2011/0129209 A1    Jun. 2, 2011

Related U.S. Application Data

(63) Continuation-in-part of application No. PCT/EP2009/061077, filed on Aug. 27, 2009.

(30) Foreign Application Priority Data

Aug. 28, 2008  (DE) .......................... 10 2008 044 839

(51) Int. Cl.
*G03B 17/00*   (2006.01)

(52) U.S. Cl. ...... 396/419; 254/34; 248/475.1; 73/866.5; 156/221; 439/34

(58) Field of Classification Search .................. 396/326, 396/419; 248/314, 475.1; 73/866.5; 156/64; 356/221; 340/693.9; 439/34; 267/205; 254/1–400; 294/101

See application file for complete search history.

(56) References Cited

U.S. PATENT DOCUMENTS

| | | | |
|---|---|---|---|
| 6,318,697 B1 * | 11/2001 | Corrado et al. | ............ 248/475.1 |
| 6,831,288 B1 * | 12/2004 | Schmitt et al. | ................ 250/573 |
| 6,894,619 B1 * | 5/2005 | Schmitt et al. | ................ 340/604 |
| 7,111,996 B2 | 9/2006 | Seger et al. | |
| 7,438,774 B2 | 10/2008 | Kurfiss et al. | |
| 7,448,596 B1 * | 11/2008 | Chang | ........................... 254/223 |
| 7,780,137 B2 * | 8/2010 | Hansel et al. | ............ 248/346.01 |
| 7,780,454 B2 | 8/2010 | Baranski | |
| 7,911,356 B2 * | 3/2011 | Wohlfahrt et al. | ......... 340/693.9 |
| 8,051,707 B2 * | 11/2011 | Roehr et al. | ............... 73/170.17 |

(Continued)

FOREIGN PATENT DOCUMENTS

DE    19922282 A1    12/1999

(Continued)

OTHER PUBLICATIONS

International Bureau, International Preliminary Report on Patentability for corresponding PCT application PCT/EP2009/061077 mailed Mar. 10, 2011.

*Primary Examiner* — Clayton E LaBalle
*Assistant Examiner* — Kevin Butler
(74) *Attorney, Agent, or Firm* — Brooks Kushman P.C.

(57) ABSTRACT

A sensor assembly for a vehicle windshield includes a retaining frame, a sensor housing, clamping hooks, a spring, and an actuating lever. The retaining frame is attachable to the windshield. The clamping hooks are connected to the housing. The clamping hooks are attachable to the retaining frame to attach the housing to the retaining frame. The spring is connected to the housing and associated with one of the clamping hooks. The actuating lever is pivotably mounted to the clamping hooks. Pivoting of the actuating lever causes the spring to compress and press the housing against the windshield when both the retaining frame is attached to the windshield and the housing is attached by the clamping hooks to the retaining frame.

19 Claims, 6 Drawing Sheets

U.S. PATENT DOCUMENTS

| | | |
|---|---|---|
| 2004/0208497 A1 | 10/2004 | Seger et al. |
| 2005/0259244 A1 | 11/2005 | Kurfiss et al. |
| 2008/0092673 A1 | 4/2008 | Hansel et al. |
| 2008/0117074 A1* | 5/2008 | Wohlfahrt et al. ......... 340/693.9 |
| 2008/0272260 A1 | 11/2008 | Baranski |
| 2011/0061445 A1* | 3/2011 | Roehr et al. ................. 73/29.02 |
| 2011/0155874 A1* | 6/2011 | Roehr et al. ............. 248/220.21 |

FOREIGN PATENT DOCUMENTS

| | | | |
|---|---|---|---|
| DE | 10162652 | A1 | 7/2003 |
| DE | 10211444 | A1 | 10/2003 |
| DE | 10238935 | A1 | 3/2004 |
| DE | 10338390 | B3 | 3/2005 |
| DE | 102004032749 | B3 | 1/2006 |
| DE | 102005003386 | B3 | 6/2006 |
| DE | 102005002686 | A1 | 8/2006 |
| DE | 102005015973 | A1 | 10/2006 |
| DE | 102006039065 | A1 | 3/2007 |
| DE | 202206017362 | U1 | 3/2008 |
| EP | 1202885 | A1 | 5/2002 |

* cited by examiner

SENSOR ASSEMBLY FOR A VEHICLE WINDSHIELD

CROSS-REFERENCE TO RELATED APPLICATIONS

This application is a continuation-in-part of International Application No. PCT/EP2009/061077, published in German, with an international filing date of Aug. 27, 2009, which claims priority to DE 10 2008 044 839.7, filed Aug. 28, 2008; the disclosures of which are incorporated by reference.

TECHNICAL FIELD

The present invention relates to a sensor assembly having a retaining frame attachable to a vehicle windshield, a sensor housing attachable to the retaining frame, and a pivotably mounted actuating lever in which the housing is coupled to the windshield through spring pressure in response to the actuating lever being pivoted.

BACKGROUND

EP 1 202 885 B1 (corresponding to U.S. Pat. No. 6,894,619) describes a sensor assembly having a fastening device attachable to a vehicle window, a sensor housing attachable to the fastening device, and a pair of lever-type fastening parts. Each fastening part is a stamped metal part having a bent end section, an elastic middle section, and a retaining bracket end section. The bent sections are movably inserted into respective pocket-shaped formations of the housing to pivotably connect the fastening parts to the housing. The retaining bracket sections of the fastening parts can be pressed against the spring tension of the elastic regions by respective pins molded on the fastening device. The housing is thereby pressed against the windshield by spring pressure. The fastening parts each form respective single-arm actuating levers by the linkages to the housing. Since the attachment of the fastening parts to the fastening device results from the application of force by corresponding sections of the single-arm actuating levers, the mounting force that can be applied to these sections is relatively large. It is also disadvantageous as the mounting force acts directly on the relatively complex molded fastening parts, which are relatively hard to manipulate. Furthermore, it is disadvantageous that the fastening parts are mounted separately in order to produce uniform pressure of the housing on the window.

SUMMARY

An object of the present invention includes a sensor assembly which is relatively simple and cost-effective, can be mounted on a vehicle windshield with relatively little expenditure of effort, and has components that can be easily manipulated during installation on the windshield.

In carrying out the above object and other objects, the present invention provides a sensor assembly for a vehicle windshield. The sensor assembly includes a retaining frame, a sensor housing, a pair of clamping hooks, a spring element, and an actuating lever. The retaining frame is attachable to the windshield. The clamping hooks are connected to the sensor housing. The clamping hooks are attachable to the retaining frame to attach the sensor housing to the retaining frame. The spring element is connected to the sensor housing and associated with a respective one of the clamping hooks. The actuating lever is pivotably mounted to the clamping hooks. Pivoting of the actuating lever causes the spring element to compress and press the sensor housing against the windshield when both the retaining frame is attached to the windshield and the sensor housing is attached by the clamping hooks to the retaining frame.

Further, in carrying out the above object and other objects, the present invention provides a sensor assembly for a vehicle windshield. The sensor assembly includes a retaining frame, a sensor housing, a pair of clamping hooks, a pair of spring elements, and an actuating lever. The retaining frame is attachable to a windshield. The clamping hooks are connected to the sensor housing. The clamping hooks are attachable to the retaining frame to attach the sensor housing to the retaining frame. The spring elements are connected to the sensor housing and respectively associated with the clamping hooks. The actuating lever is pivotably mounted to the clamping hooks. Pivoting of the actuating lever causes the spring elements to compress and press the sensor housing against the windshield when both the retaining frame is attached to the windshield and the sensor housing is attached by the clamping hooks to the retaining frame.

A sensor assembly in accordance with an embodiment of the present invention includes a retaining frame attachable to a vehicle windshield, a sensor housing which can be joined to the retaining frame, and a pivot-mounted actuating lever. The sensor housing can be snapped onto the windshield by pivoting of the actuating lever, wherein tensioning or clamping hooks connected to the sensor housing can be attached to the retaining frame for pivot-mounting of the actuating lever, and wherein by pivoting of the actuating lever, a spring element(s) presses the sensor housing against the windshield. That is, the tensioning or clamping hooks can be attached to the retaining frame to which the actuating lever is pivotably mounted. The actuating lever compresses a spring element(s) that presses the sensor housing against the windshield due to the pivoting motion.

In an embodiment, the pivotably mounted actuating lever is a comfortably manipulated means for clamping the sensor housing to the retaining frame.

In an embodiment, the actuating lever is designed as a two-arm lever. The second lever arm is formed by an eccentric connected to the pivot axis of the actuating lever that acts on a leaf spring connected to the sensor housing. A high pressure force can hereby be achieved by the sensor housing on the windshield with relatively small actuating force on the actuating lever. The pressure force can be precisely applied and can also be limited to a maximum value by the shape of the eccentric and the design of the leaf spring. Alternatively, the spring element can also be made from an elastically deformable section of the sensor housing.

In an embodiment, the actuating lever can be pre-latched with the retaining frame prior to pressing the sensor housing onto the windshield. This is preferentially achieved by providing clamping means on the clamping hooks that reach behind the rear cutouts on the retaining frame. The clamping means can in particular be designed as hook shaped formed parts that can be combined with grooves or pins formed on the retaining frame.

The above features, and other features and advantages of the present invention are readily apparent from the following detailed descriptions thereof when taken in connection with the accompanying drawings.

DETAILED DESCRIPTION

Referring now to FIGS. 1 through 4, perspective views of a sensor assembly in accordance with a first embodiment of the present invention are shown. FIGS. 1 through 4 illustrate different vehicle window installation phases of the sensor assembly. As explained below, the different phases run through FIGS. 1 through 4 from an initial assembly phase shown in FIG. 1 to a final installation phase shown in FIG. 4.

The sensor assembly includes a retaining frame 13, a sensor housing 7, and an essentially U-shaped pivotably-mounted actuating lever 5. Retaining frame 13 can be fastened to a vehicle windshield by an adhesive or the like. Sensor housing 7 is attachable (e.g., can be clamped) to retaining frame 13.

Figure 1:
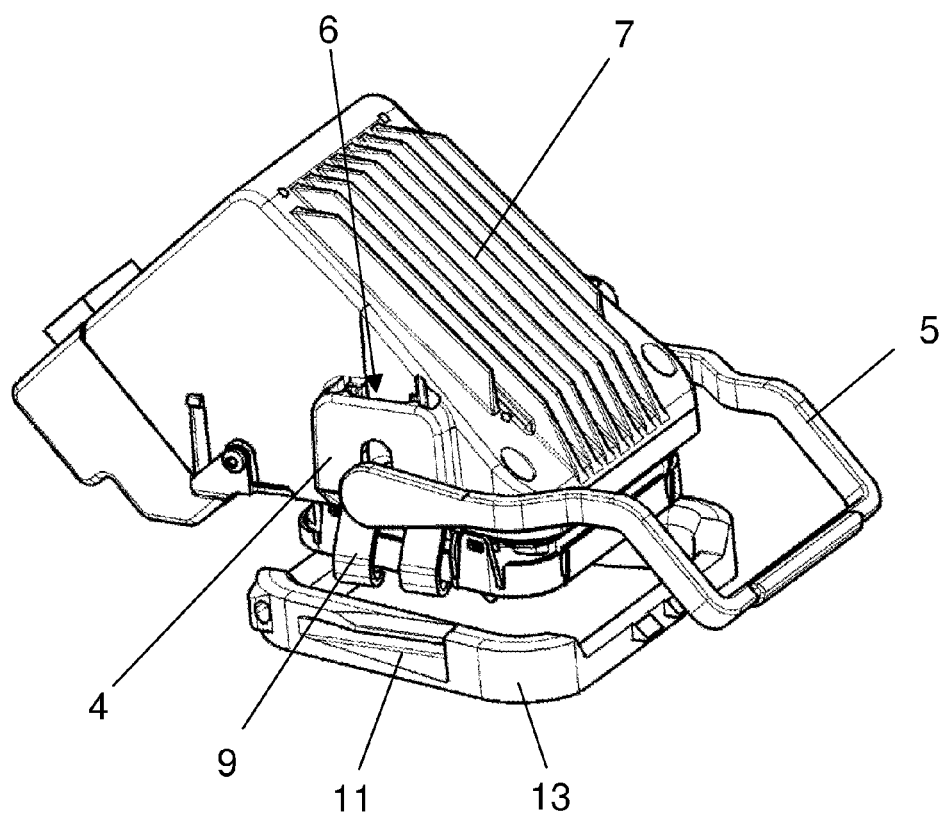
FIGS. 1 through 4 illustrate perspective views during different vehicle window installation phases of a sensor assembly in accordance with a first embodiment of the present invention.
Figure 2:
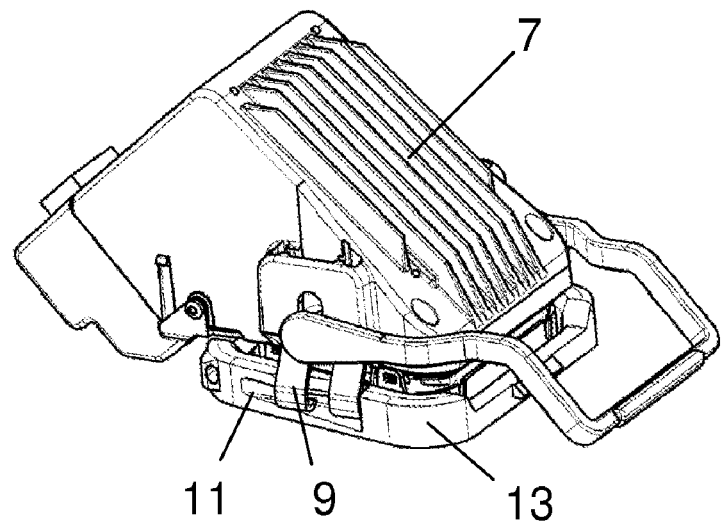
Figure 3:
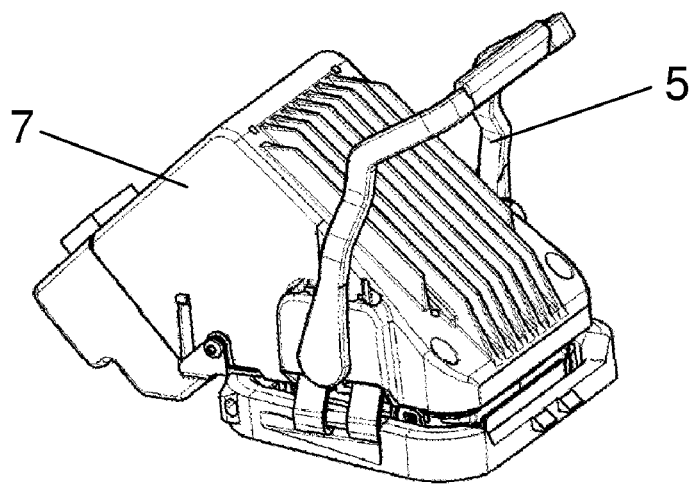
Figure 4:
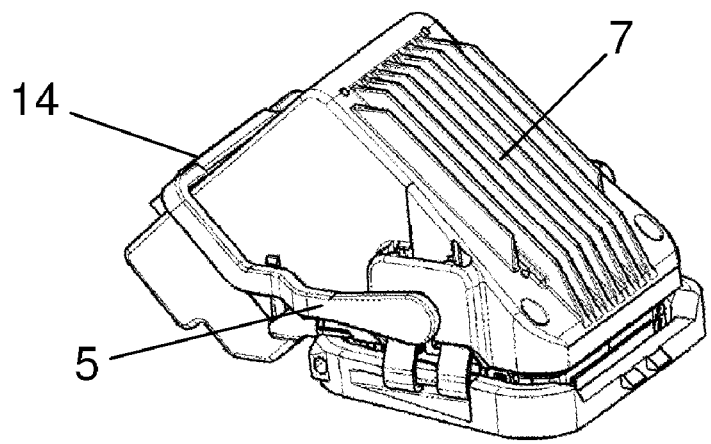
Figure 5:
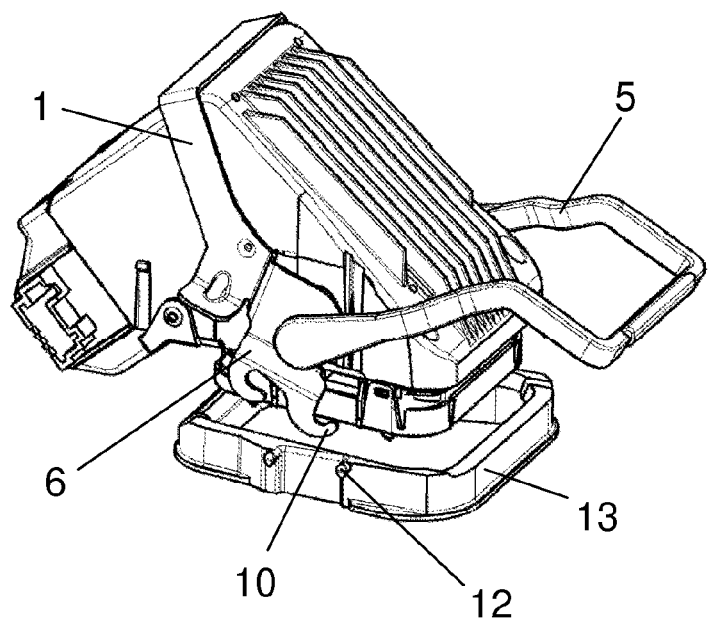
FIGS. 5 through 8 illustrate perspective views of different vehicle window installation phases of the sensor assembly in accordance with a second embodiment of the present invention.

In FIG. 1, sensor housing 7 is unattached from retaining frame 13. In FIG. 4, sensor housing 7 is fully attached to retaining frame 13 with retaining frame 13 being fastened to the windshield to thereby form a final mounted state of the sensor assembly.

Sensor housing 7 houses electronic and optical components. Such components may include a light conductor for coupling electromagnetic radiation through an optical coupler into and out of the windshield, a circuit board for mounting electronic sensor components and connecting them electrically with one another, etc. Sensor housing 7 preferentially houses at least one optical sensor such as a camera.

The sensor assembly further includes a pair of clamping hooks 6. Each clamping hook 6 is made of metal. Sensor housing 7 includes a pair of receiving pockets 4. Receiving pockets 4 are located on opposite parallel sides of sensor housing 7. One of receiving pockets 4 on one of the sides of sensor housing 7 can be seen in FIGS. 1 through 4. The other receiving pocket 4 is on the opposite side of sensor housing 7. Clamping hooks 6 are respectively inserted into receiving pockets 4 to mechanically connect with sensor housing 7. Actuating lever 5 is pivotably mounted on clamping hooks 6.

Each clamping hook 6 includes a pair of wrap-around elements 9. Wrap-around elements 9 are integrally molded on respective clamping hooks 6. Wrap-around elements 9 are bent in the direction of sensor housing 7. Opposite edge sections of retaining frame 13 include respective grooves 11 formed thereon. Wrap-around elements 9 of each clamping hook 6 mechanically connect respectively with grooves 11 of retaining frame 13 in order to provide a mechanical connection between sensor housing 7 and retaining frame 13.

During the installation process, sensor housing 7 is inserted into a receiving region of retaining frame 13. Upon insertion of sensor housing 7 into the receiving region of retaining frame 13, wrap-around elements 9 slide over the edge sections of retaining frame 13 and penetrate laterally into grooves 11 formed on retaining frame 13. Sensor housing 7 is thereby already loosely pre-latched with retaining frame 13 (see FIG. 2).

The sensor assembly further includes a pair of strip-shaped leaf springs 3 (shown in FIGS. 9 through 12). Springs 3 are respectively arranged within sensor housing adjacent to the opposite sides of the sensor housing 7. Springs 3 are connected to sensor housing 7. Springs 3 are clamped by tilting actuating lever 5 back over sensor housing 7 (see FIG. 3) which press sensor housing 7 against the windshield.

If actuating lever 5 has not reached its end position shown in FIG. 4, then an offset actuating section 14 of actuating lever 5 fits snugly against a plurality of outer surfaces of sensor housing 7.

Figure 9:
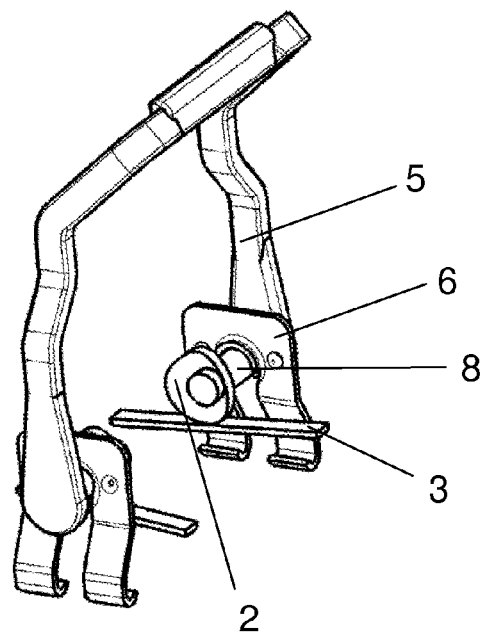
FIG. 9 illustrates the actuating lever and associated components of the sensor assembly shown in FIGS. 1 through 4.

The compression of each spring 3 is illustrated in FIGS. 9 through 12. FIG. 9 illustrates actuating lever 5, which as indicated above, is pivotably mounted on the pair of clamping hooks 6. As further indicated above, clamping hooks 6 are inserted into respective receiving pockets 4 of sensor housing 7. Actuating lever 5 includes two pivot axes 8 which are respectively associated with clamping hooks 6. Each pivot axis 8 is respectively connected with an eccentric 2. Springs 3 are respectively tangential to eccentrics 2.

As noted above, the individually depicted springs 3 are components of sensor housing 7. Sensor housing 7 is shown respectively in FIGS. 10, 11, and 12 without its outer surfaces and thus without a housing cover.

Figure 10:
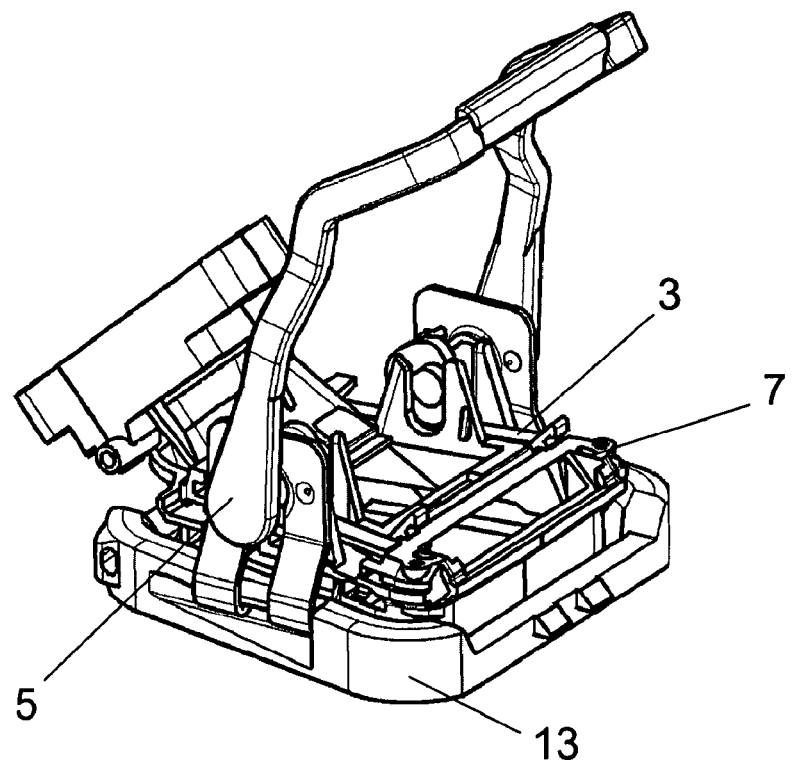
FIG. 10 illustrates a cut-away perspective view of the sensor assembly as shown in FIG. 3.
Figure 11:
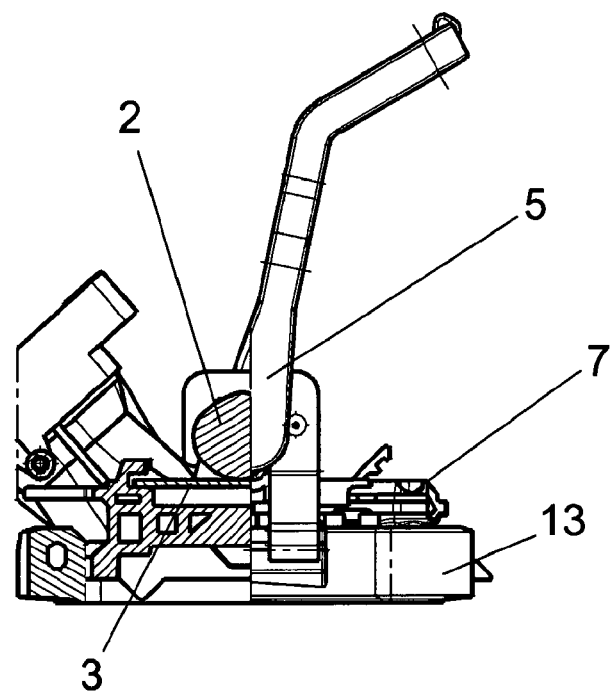
FIG. 11 illustrates a side-sectional view of the sensor assembly as shown FIG. 10.

As best shown in FIGS. 10 and 11, each spring 3 is horizontally connected with sensor housing 7 such that springs 3 are parallel to the coupling surface of sensor housing 7 on the windshield. Actuating lever 5 is shown in FIGS. 10 and 11 in an intermediate pivoted position. Eccentrics 2 lie respectively on a mid-section of the corresponding springs 3. The radii of eccentrics 2 relative to springs 3 increases with the tilt of actuating lever 5 such that springs 3 are increasingly compressed in the middle. In this manner, spring forces arise in the end sections of springs 3, where they are respectively connected to sensor housing 7, which press sensor housing 7 in the direction of the windshield.

Figure 12:
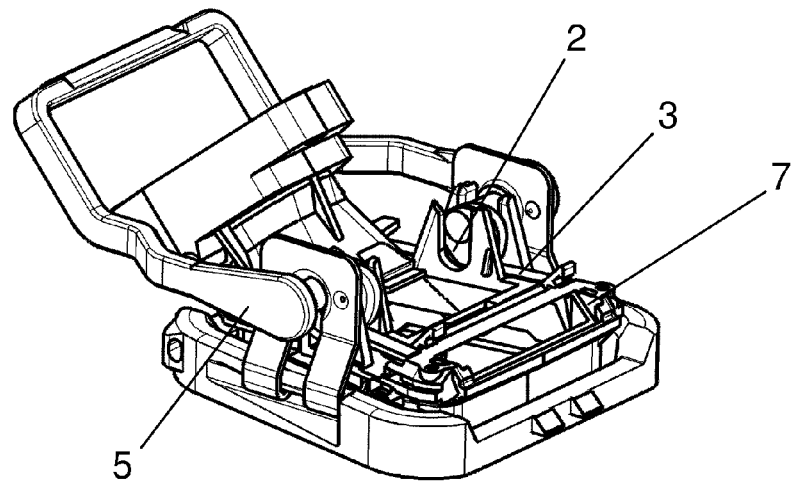
FIG. 12 illustrates a cut-away perspective view of the sensor assembly as shown in FIG. 4.

As shown in FIG. 12, the maximum radii of eccentrics 2 occur on springs 3 in the final position of actuating lever 5 (see FIG. 4) such that the maximum pressure force on sensor housing 7 is achieved here. Advantageously, the shape of eccentrics 2 can be specified so that the spring compression already assumes a respective local maximum before the final position of actuating lever 5 is reached such that a particularly stable final position is assumed due to the subsequent relaxation of springs 3 in the final position of actuating lever 5.

Referring now to FIGS. 5 through 8, perspective views of a sensor assembly in accordance with a second embodiment of the present invention are shown. FIGS. 5 through 8 illustrate different vehicle window installation phases of the sensor assembly. The different phases run from an initial assembly phase shown in FIG. 9 to a final installation phase shown in FIG. 12. The same or comparable components of the first and second embodiments of the sensor assembly are designated with the same reference numbers.

The difference between the embodiments is that the second embodiment of the sensor assembly, shown in FIGS. 5 through 8, is primarily in the wrap-around elements on clamping hooks 6. In the second embodiment, wrap-around elements 10 are not perpendicular to clamping hooks 6 as wrap-around elements 9 in the first embodiment. Rather, in the second embodiment, wrap-around elements 10 are bent in the direction of clamping hooks 6 as shown in FIGS. 5 through 8. In the second embodiment, wrap-around elements 10 can hereby be attached with pins 12 formed on retaining frame 13.

In the second embodiment, clamping hooks 6 are also connected with one another by an integrally molded bracket 1. As a result, the arrangement of clamping hooks 6, bracket 1, and actuating lever 5 already forms a relatively stable and easily manipulated arrangement that can be placed over sensor housing 7.

Figure 6:
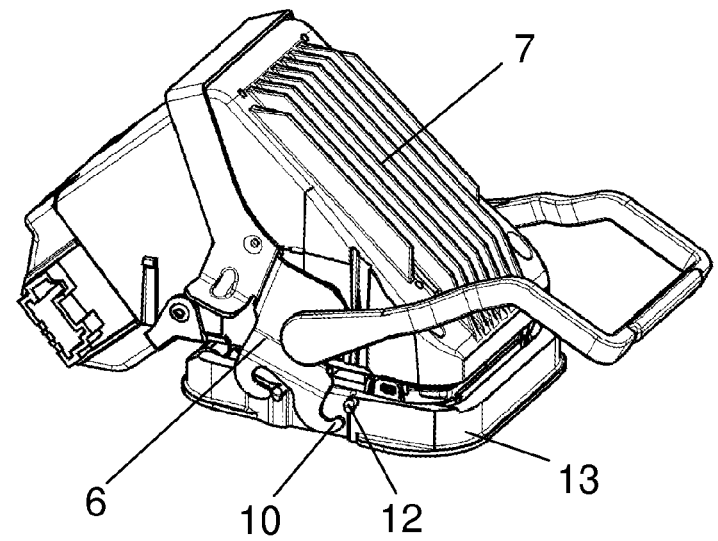
Figure 7:
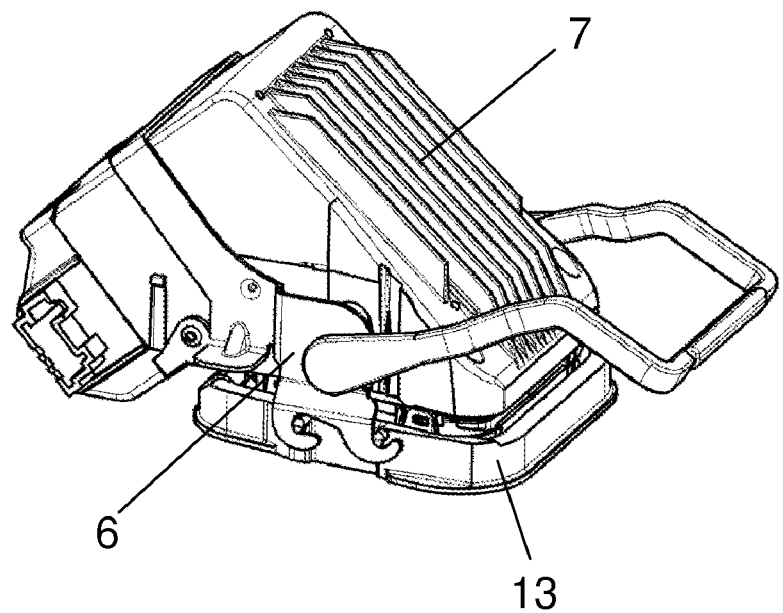

In FIG. 6, sensor housing 7 is already loosely attached to retaining frame 13. Wrap-around elements 10 are hooked to pins 12 by a tilting motion of bracket 1. As shown in FIG. 7, clamping hooks 6 are pre-latched to retaining frame 13 and are aligned on retaining frame 13. Bracket 1 fits against the outer surfaces of sensor housing 7. Additional attachments of clamping hooks 6 on sensor housing 7, such as in receiving pockets 4 as in the first embodiment, are thus no longer required.

Figure 8:
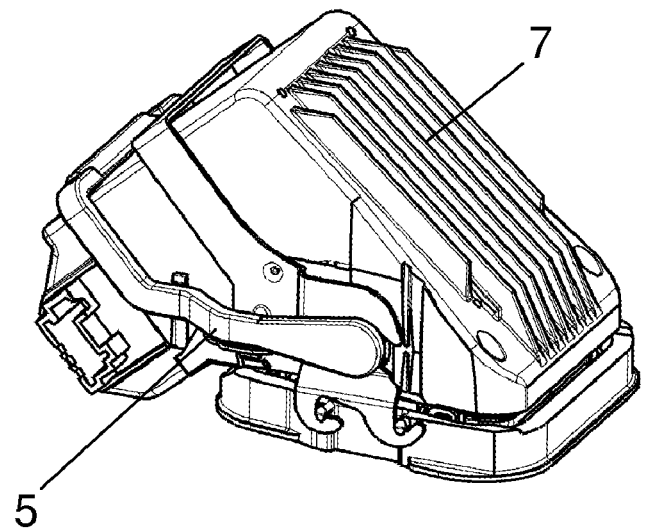

In a final mounting step, actuating lever 5 is brought to its final position shown in FIG. 8. Here, a pair of eccentrics 2 combined with actuating lever 5 compress respective spring elements in the manner described above, whereby sensor housing 7 is pressed against the windshield.

REFERENCE NUMBERS 1 bracket
2 eccentric
3 spring element (leaf spring)
4 receiving pocket
5 actuating lever
6 clamping hooks
7 sensor housing
8 pivot axis
9 wrap-around element
10 wrap-around element
11 grooves
12 pins
13 retaining frame
14 actuating section As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A sensor assembly for a vehicle windshield, the sensor assembly comprising:
a retaining frame attachable to a windshield;
a sensor housing;
a pair of clamping hooks connected to the sensor housing, wherein the clamping hooks are attachable to the retaining frame to attach the sensor housing to the retaining frame;
a spring element connected to the sensor housing and adjacent to a respective one of the clamping hooks and physically separate from the clamping hooks; and
an actuating lever pivotably mounted to the clamping hooks, wherein pivoting of the actuating lever causes the spring element to compress and press the sensor housing against the windshield, with the clamping hooks being uncompressed from the pivoting of the actuating lever, when both the retaining frame is attached to the windshield and the sensor housing is attached by the clamping hooks to the retaining frame.

2. The sensor assembly of claim 1 wherein:
the actuating lever is U-shaped.

3. The sensor assembly of claim 1 wherein:
the spring element is a leaf spring.

4. The sensor assembly of claim 1 wherein:
the spring element is an elastically deformable section of the sensor housing.

5. The sensor assembly of claim 1 further comprising:
an eccentric connected to the actuating lever and engaged with the spring element, wherein pivoting of the actuating lever causes the eccentric to move against the spring element and thereby compress the spring element.

6. The sensor assembly of claim 1 wherein:
each clamping hook includes wrap-around elements connectable with the retaining frame in order to attach the clamping hook to the retaining frame.

7. The sensor assembly of claim 6 wherein:
the retaining frame includes a pair of grooves for the wrap-around elements of the clamping hooks, wherein the wrap-around elements are respectively connectable with the grooves in order to be connectable with the retaining frame.

8. The sensor assembly of claim 6 wherein:
the retaining frame includes pins for the wrap-around elements of the clamping hooks, wherein the wrap-around elements are respectively connectable with the pins in order to be connectable with the retaining frame.

9. The sensor assembly of claim 1 wherein:
the sensor housing contains at least one optical sensor.

10. The sensor assembly of claim 9 wherein:
the optical sensor is a camera.

11. The sensor assembly of claim 1 wherein:
the sensor housing includes a pair of receiving pockets;
wherein the clamping hooks are respectively inserted into the receiving pockets to be connected to the sensor housing.

12. A sensor assembly for a vehicle windshield, the sensor assembly comprising:
a retaining frame attachable to a windshield;
a sensor housing;
a pair of clamping hooks connected to the sensor housing, wherein the clamping hooks are attachable to the retaining frame to attach the sensor housing to the retaining frame;
a pair of spring elements connected to the sensor housing and respectively adjacent to the clamping hooks and physically separate from the clamping hooks; and
an actuating lever pivotably mounted to the clamping hooks, wherein pivoting of the actuating lever causes the spring elements to compress and press the sensor housing against the windshield, with the clamping hooks being uncompressed from the pivoting of the actuating lever, when both the retaining frame is attached to the windshield and the sensor housing is attached by the clamping hooks to the retaining frame.

13. The sensor assembly of claim 12 wherein:
at least one of the spring elements is a leaf spring.

14. The sensor assembly of claim 12 wherein:
at least one of the spring element is an elastically deformable section of the sensor housing.

15. The sensor assembly of claim 12 further comprising:
a pair of eccentrics connected to the actuating lever and respectively engaged with the spring elements, wherein pivoting of the actuating lever causes the eccentrics to move against the respective spring elements and thereby compress the respective spring elements.

16. The sensor assembly of claim 12 wherein:
each clamping hook includes wrap-around elements connectable with the retaining frame in order to attach the clamping hook to the retaining frame.

17. The sensor assembly of claim 16 wherein:
the retaining frame includes a pair of grooves for the wrap-around elements of the clamping hooks, wherein the wrap-around elements are respectively connectable with the grooves in order to be connectable with the retaining frame.

18. The sensor assembly of claim 16 wherein:
the retaining frame includes pins for the wrap-around elements of the clamping hooks, wherein the wrap-around elements are respectively connectable with the pins in order to be connectable with the retaining frame.

19. The sensor assembly of claim 12 wherein:
the sensor housing includes a pair of receiving pockets;
wherein the clamping hooks are respectively inserted into the receiving pockets to be connected to the sensor housing.

\* \* \* \* \*